US012433968B2

(12) United States Patent
Suetsugu

(10) Patent No.: US 12,433,968 B2
(45) Date of Patent: Oct. 7, 2025

(54) STERILIZING APPARATUS AND STERILIZING METHOD

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 804 days.

(21) Appl. No.: 17/572,914

(22) Filed: Jan. 11, 2022

(65) Prior Publication Data

US 2022/0226530 A1 Jul. 21, 2022

(30) Foreign Application Priority Data

Jan. 21, 2021 (JP) ................................ 2021-007788

(51) Int. Cl.
*A61L 9/14* (2006.01)
*A61L 9/20* (2006.01)

(52) U.S. Cl.
CPC .................. *A61L 9/14* (2013.01); *A61L 9/20* (2013.01); *A61L 2209/12* (2013.01); *A61L 2209/134* (2013.01); *A61L 2209/21* (2013.01)

(58) Field of Classification Search
CPC ..... A61L 9/14; A61L 2/22; A61L 2/10; A61L 9/20
See application file for complete search history.

(56) References Cited

U.S. PATENT DOCUMENTS

2002/0098109 A1* 7/2002 Nelson ...................... A61L 2/10 422/123
2017/0173607 A1* 6/2017 Wright .................. B05B 9/0861
2020/0215214 A1* 7/2020 Rosen ..................... A61L 2/084
2021/0278343 A1* 9/2021 Rosen ................... H04N 23/56

FOREIGN PATENT DOCUMENTS

CN 209243439 U * 8/2019
JP 2018-51186 4/2018
JP 2019-119704 7/2019
JP 2019-152105 9/2019

* cited by examiner

*Primary Examiner* — Donald R Spamer
*Assistant Examiner* — Kayla Rose Sarantakos
(74) *Attorney, Agent, or Firm* — Wenderoth, Lind & Ponack, L.L.P.

(57) ABSTRACT

A sterilization apparatus includes a fanner that has an inlet through which air is inhaled and an outlet from which the air is blown out and blows out a spiral air current from the outlet, an atomizer that sprays a chemical solution for sterilization into the air to be blown out from the outlet, into the spiral air current blown out from the outlet, or on a sterilization target, and a light emitter that emits light in the direction in which the spiral air current is blown out from the outlet.

10 Claims, 11 Drawing Sheets

FIG. 7

BLOW OUT SPIRAL AIR CURRENT WITH CHEMICAL SOLUTION BEING SPRAYED, TO CAUSE STERILIZING AGENT AND FLUORESCENT AGENT TO ADHERE TO STERILIZATION TARGET — S1

IRRADIATE FLUORESCENT AGENT ADHERING TO STERILIZATION TARGET WITH ULTRAVIOLET LIGHT, TO CAUSE FLUORESCENT AGENT TO GLOW OR TO COLOR — S2

BLOW OUT SPIRAL AIR CURRENT WITH SPRAYING OF CHEMICAL SOLUTION STOPPED, TO CAUSE STERILIZING AGENT ADHERING TO STERILIZATION TARGET TO EVAPORATE OR TO BE BLOWN AWAY — S3

FIG. 8
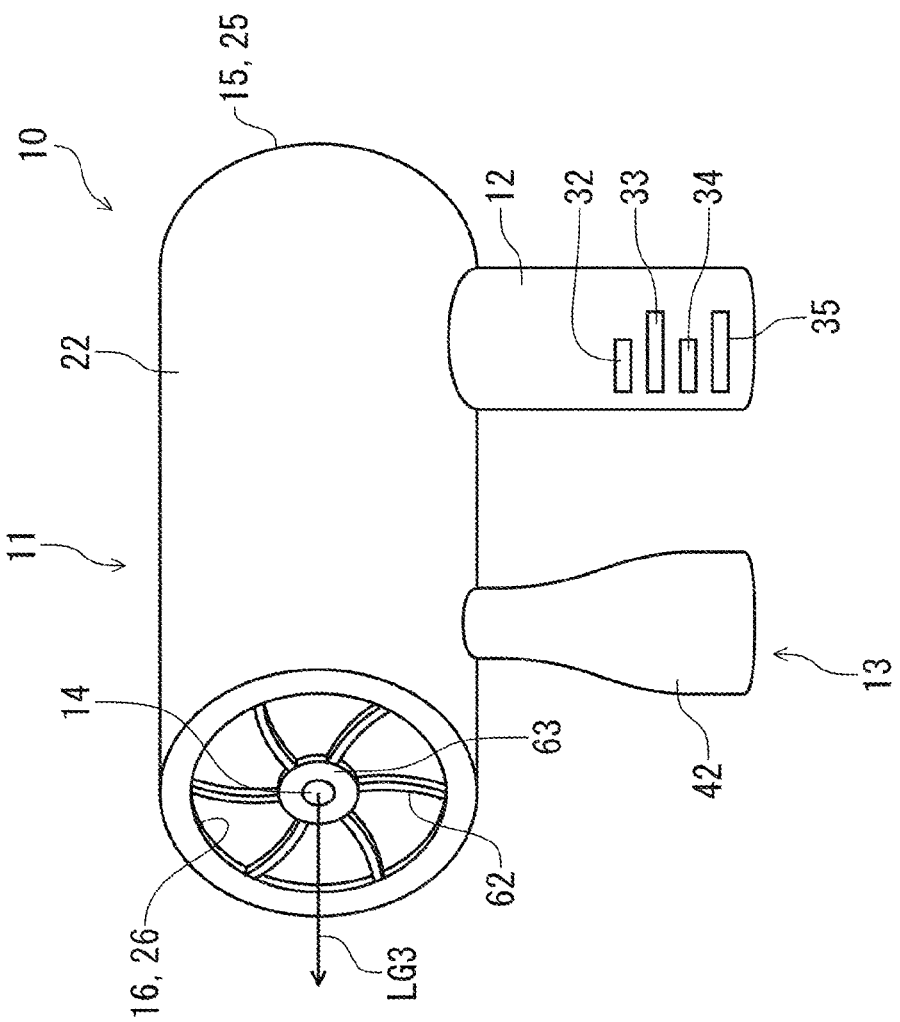
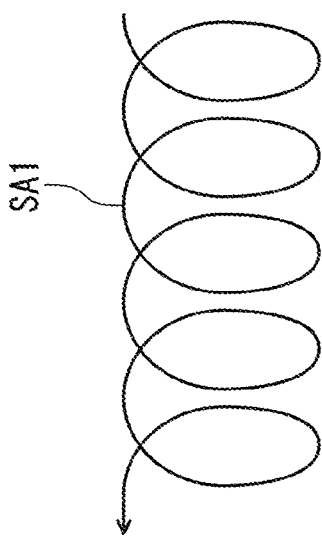

FIG. 9

```
┌─────────────────────────────────────────────────────────┐
│  BLOW OUT SPIRAL AIR CURRENT WITH VISIBLE LIGHT BEING   │
│  EMITTED AND CHEMICAL SOLUTION BEING SPRAYED, TO CAUSE  │─── S11
│    STERILIZING AGENT TO ADHERE TO STERILIZATION TARGET  │
└─────────────────────────────────────────────────────────┘
                            │
                            ▼
┌─────────────────────────────────────────────────────────┐
│   BLOW OUT SPIRAL AIR CURRENT WITH SPRAYING OF CHEMICAL │
│  SOLUTION STOPPED, TO CAUSE STERILIZING AGENT ADHERING TO│─── S12
│   STERILIZATION TARGET TO EVAPORATE OR TO BE BLOWN AWAY │
└─────────────────────────────────────────────────────────┘
```

FIG. 11

```
SPRAY CHEMICAL SOLUTION ON STERILIZATION TARGET BY
ATOMIZER, TO CAUSE STERILIZING AGENT AND FLUORESCENT  —— S21
AGENT TO ADHERE TO STERILIZATION TARGET
         │
         ▼
IRRADIATE FLUORESCENT AGENT ADHERING TO STERILIZATION
TARGET WITH ULTRAVIOLET LIGHT, TO CAUSE FLUORESCENT   —— S22
AGENT TO GLOW OR TO COLOR
         │
         ▼
BLOW OUT SPIRAL AIR CURRENT WITH SPRAYING OF CHEMICAL
SOLUTION STOPPED, TO CAUSE STERILIZING AGENT ADHERING TO —— S23
STERILIZATION TARGET TO EVAPORATE OR TO BE BLOWN AWAY
```

STERILIZING APPARATUS AND STERILIZING METHOD

BACKGROUND

Technical Field

The present invention relates to a sterilization apparatus that sterilizes a sterilization target and a sterilization method of sterilizing a sterilization target.

Related Art

In recent years, the number of cases of worldwide epidemics of infectious diseases due to viruses or germs has increased. An example of such an infectious disease is Coronavirus disease 2019 (COVID-19). In various types of public services, such as means of public transport, or in other various types of business conditions, such as playground equipment providing services and service industries, such as restaurants, as work for sterilization, namely, disinfection against such viruses or germs as described above, a chemical solution for sterilization, namely, for disinfection is sprayed to adhere to a sterilization target and then the chemical solution adhering to the sterilization target is wiped off to sterilize the sterilization target.

Meanwhile, disclosed has been a technology regarding diffusion of medication into the air sent by a blower. JP 2018-51186 A discloses a technology regarding a blower medication diffuser that diffuses medication into the air sent by a blower and includes a medication retainer that is breathable and retains the medication that volatilizes at room temperature, and a diffuser body to which the medication retainer is attached, in which the diffuser body is provided with an air guide wall that bends the flow of the air sent by the blower toward the medication retainer and a discharge opening from which the air having passed through the medication retainer is discharged.

JP 2019-119704 A discloses a technology regarding a method of spatially diffusing a repellent, the method including: attaching a blower attachable repellent sheet retaining a repellent aqueous composition in an amount of 68 to 750% by mass to the mass of a base sheet to a blower so as to be out of contact with the blades that rotate in the blower and to avoid a forward flow of air from the blower, the repellent aqueous composition containing the repellent having a vapor pressure of 0.00006 to 210 Pa at 25° C. in an amount of 0.1 to 20% by mass; and driving the blower indoors.

Disclosed has been a technology regarding illumination in the sending direction of air from an air outlet with a light source. JP 2019-152105 A discloses a technology regarding a blower including: a housing that is tubular in shape and has an outer circumferential face functioning as a grip; a drive source housed in the housing; a blowing fan that is housed in connection with the drive source in the housing and sends wind outward through an air outlet provided at one end portion of the housing; and a battery case that is provided inside the other end portion of the housing and houses detachably a secondary battery that supplies power to the drive source. According to the technology in JP 2019-152105 A above, the housing has the one end portion provided with a light source that performs illumination in the sending direction of wind from the air outlet.

SUMMARY

In the various types of public services or in the various types of business conditions described above, much labor is required for sterilization work in which a chemical solution for sterilization, namely, for disinfection is sprayed to adhere to a sterilization target and then the chemical solution adhering to the sterilization target is wiped off to clean off the viruses or germs adhering to the sterilization target, resulting in sterilization of the sterilization target. That is, in order to sterilize the sterilization target sufficiently, highly-frequent and regular sterilization work is required. Considerable time is required for one flow of sterilization work. Therefore, it is difficult to sterilize the sterilization target promptly and sufficiently.

According to the respective technologies in JP 2018-51186 A and JP 2019-119704 A above, although the medication can be diffused into the air sent by the blower, it is difficult to blow a sterilizing agent on a sterilization target reliably. According to the technology in JP 2019-152105 A above, although illumination in the sending direction of wind from the air outlet can be achieved by the light source, it is difficult to blow a sterilizing agent on a sterilization target reliably.

The present invention has been made in order to solve such problems in conventional technologies as above, and an object of the present invention is to provide a sterilization apparatus that sterilizes a sterilization target and enables reliable blowing of a sterilizing agent on the sterilization target, prompt removal of the sterilizing agent blown on the sterilization target, and prompt and sufficient sterilization of the sterilization target.

Representative aspects of the invention disclosed in the present application will be given below.

According to one aspect of the present invention, provided is a sterilization apparatus that sterilizes a sterilization target. The sterilization apparatus includes: a fanner having an inlet through which air is inhaled and an outlet from which the air is blown out, the fanner being configured to blow out a spiral air current from the outlet; an atomizer configured to spray a chemical solution for sterilization into the air to be blown out from the outlet, into the spiral air current blown out from the outlet, or on the sterilization target; and a first light emitter configured to emit first light in a direction in which the spiral air current is blown out from the outlet.

According to another aspect, the chemical solution may contain a sterilizing agent and a fluorescent agent that glows due to irradiation with ultraviolet light, and the first light may include the ultraviolet light.

According to another aspect, the sterilization apparatus may further include a second light emitter configured to emit second light including visible light in the direction in which the spiral air current is blown out from the outlet.

According to another aspect, a first outer diameter of the first light emitted by the first light emitter may be larger than a second outer diameter of the second light emitted by the second light emitter.

According to another aspect, the fanner may include: a barrel; and a fan provided inside the barrel, the inlet may be provided at a first end portion in an axial direction of the barrel, the outlet may be provided at a second end portion opposite to the first end portion in the axial direction of the barrel, and the fan may inhale the air through the inlet and blow out, through the outlet, the air inhaled through the inlet. The first light emitter may be annular in shape when viewed in the axial direction of the barrel, surrounding a circumference of the second light emitter.

According to another aspect, the fanner may include a grille that is provided at the outlet and has a plurality of openings each having a curled shape curling clockwise or counterclockwise when viewed in the axial direction of the barrel.

According to one aspect of the present invention, provided is a sterilization method of sterilizing a sterilization target by a sterilization apparatus including: a fanner having an inlet through which air is inhaled and an outlet from which the air is blown out, the fanner being configured to blow out a spiral air current from the outlet; an atomizer configured to spray a chemical solution for sterilization into the air to be blown out from the outlet or into the spiral air current blown out from the outlet; and a first light emitter configured to emit first light including the ultraviolet light in a direction in which the spiral air current is blown out from the outlet. The chemical solution contains a sterilizing agent and a fluorescent agent that glows due to irradiation with ultraviolet light. The sterilization method includes: (a) blowing out the spiral air current by the fanner with the atomizer spraying the chemical solution such that the sterilizing agent and the fluorescent agent adhere to the sterilization target and the sterilizing agent adhering to the sterilization target sterilizes the sterilization target; and (b) irradiating the fluorescent agent adhering to the sterilization target with the first light by the first light emitter, to cause the fluorescent agent to glow.

According to another aspect, the sterilization method may further include (c) blowing out, after the (a), the spiral air current by the fanner with the atomizer having stopped spraying the chemical solution, to cause the sterilizing agent adhering to the sterilization target to evaporate or to be blown away.

According to another aspect, the sterilization apparatus may further include a second light emitter configured to emit second light including visible light in the direction in which the spiral air current is blown out from the outlet. The (a) may include blowing out the spiral air current by the fanner with the second light emitter irradiating the sterilization target with the second light and the atomizer spraying the chemical solution such that the sterilizing agent and the fluorescent agent adhere to the sterilization target and the sterilizing agent adhering to the sterilization target sterilizes the sterilization target.

According to one aspect of the present invention, provided is a sterilization method of sterilizing a sterilization target by a sterilization apparatus including: a fanner having an inlet through which air is inhaled and an outlet from which the air is blown out, the fanner being configured to blow out a spiral air current from the outlet; an atomizer configured to spray a chemical solution for sterilization into the air to be blown out from the outlet or into the spiral air current blown out from the outlet; and a first light emitter configured to emit first light including visible light in a direction in which the spiral air current is blown out from the outlet. The chemical solution contains a sterilizing agent. The sterilization method includes (a) blowing out the spiral air current by the fanner with the first light emitter irradiating the sterilization target with the first light and the atomizer spraying the chemical solution such that the sterilizing agent adheres to the sterilization target and the sterilizing agent adhering to the sterilization target sterilizes the sterilization target.

According to another aspect, the sterilization method may further include (b) blowing out, after the (a), the spiral air current by the fanner with the atomizer having stopped spraying the chemical solution, to cause the sterilizing agent adhering to the sterilization target to evaporate or to be blown away.

According to one aspect of the present invention, provided is a sterilization method of sterilizing a sterilization target by a sterilization apparatus including: a fanner having an inlet through which air is inhaled and an outlet from which the air is blown out, the fanner being configured to blow out a spiral air current from the outlet; an atomizer configured to spray a chemical solution for sterilization on the sterilization target; and a first light emitter configured to emit first light including the ultraviolet light in a direction in which the spiral air current is blown out from the outlet. The chemical solution contains a sterilizing agent and a fluorescent agent that glows due to irradiation with ultraviolet light. The sterilization method includes: (a) spraying the chemical solution on the sterilization target by the atomizer such that the sterilizing agent and the fluorescent agent adhere to the sterilization target and the sterilizing agent adhering to the sterilization target sterilizes the sterilization target; and (b) irradiating the fluorescent agent adhering to the sterilization target with the first light by the first light emitter, to cause the fluorescent agent to glow.

According to another aspect, the sterilization method may further include (c) blowing out, after the (a), the spiral air current by the fanner with the atomizer having stopped spraying the chemical solution, to cause the sterilizing agent adhering to the sterilization target to evaporate or to be blown away.

According to one aspect of the present invention, provided is a sterilization apparatus that sterilizes a sterilization target and enables reliable blowing of a sterilizing agent on the sterilization target, prompt removal of the sterilizing agent blown on the sterilization target, and prompt and sufficient sterilization of the sterilization target.

BRIEF DESCRIPTION OF DRAWINGS

FIG. 7 is a flowchart of steps as part in the sterilization method according to the embodiment;

FIG. 8 is a schematic perspective view of the configuration of a sterilization apparatus according to a first modification of the embodiment;

FIG. 9 is a flowchart of steps as part in a sterilization method according to the first modification of the embodiment;

FIG. 11 is a flowchart of steps as part in a sterilization method according to the second modification of the embodiment.

DETAILED DESCRIPTION

Figure 1:
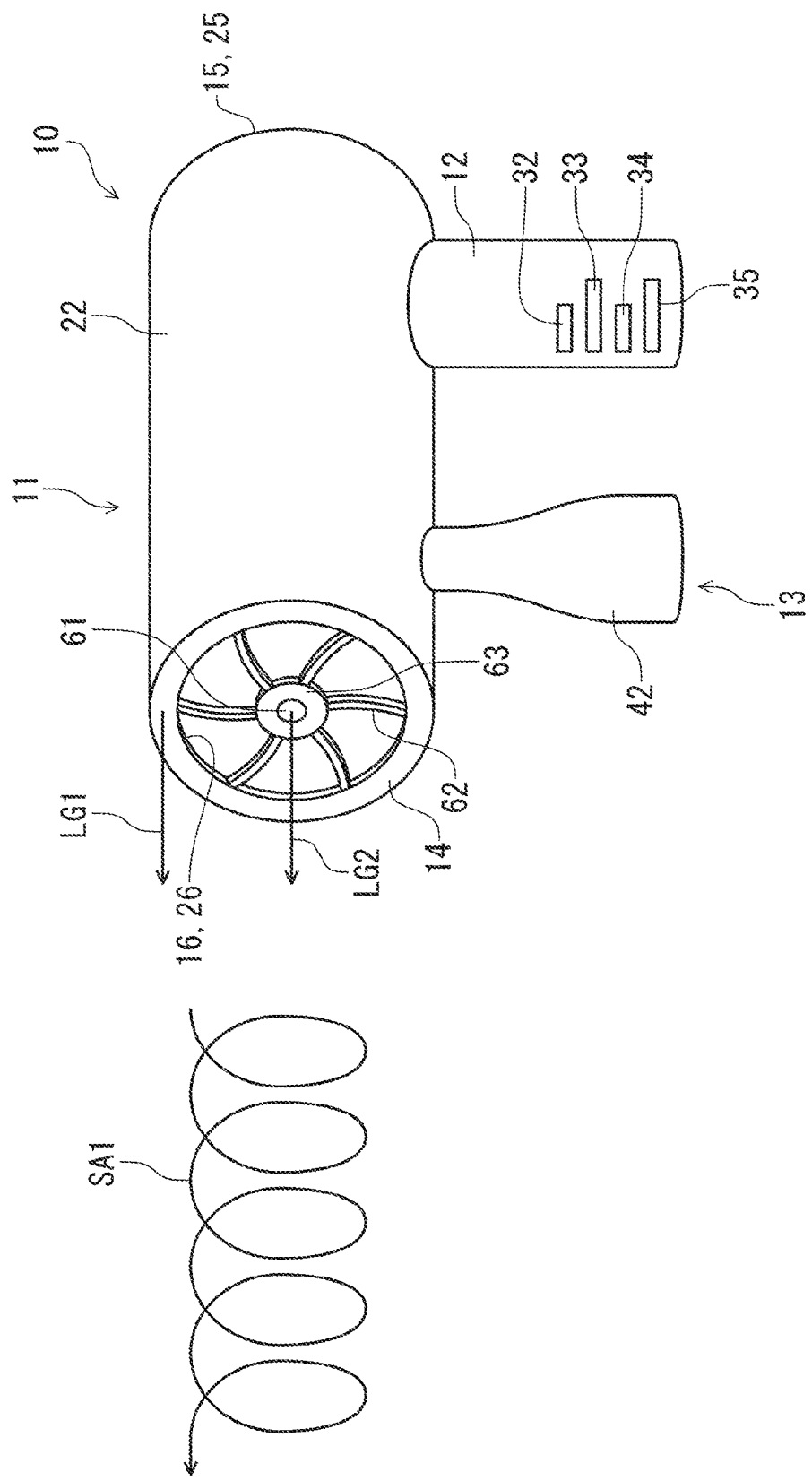
FIG. 1 is a schematic perspective view of an exemplary configuration of a sterilization apparatus according to an embodiment.

An embodiment and modifications according to the present invention will be described below with reference to the drawings.

Note that the disclosure is just exemplary and the scope of the present invention rightly includes appropriate alternations to be conceived easily by those skilled in the art without departing from the spirit of the invention. For more clarification of description, some of the drawings are schematic, for example, in the width, thickness, and shape of each part in comparison to the embodiment, but are just exemplary. Thus, the present invention is not limited in interpretation.

In the present specification and each figure, elements similar to those in any already given figure are denoted with the same reference signs and thus detailed descriptions thereof may be appropriately omitted.

Furthermore, even a sectional view in the drawings used in the embodiment may have hatching omitted for easy viewing. Even a plan view may have hatching for easy viewing.

Note that, in a case where a target is in the range of A to B in the following embodiment, unless otherwise stated, the target is A or more and B or less.

Embodiment

<Sterilization Apparatus and Sterilization Method>

A sterilization apparatus and a sterilization method by the sterilization apparatus, according to an embodiment as one mode of the present invention, will be described. The sterilization apparatus according to the present embodiment serves as a sterilization apparatus that sterilizes a sterilization target, and the sterilization method according to the present embodiment serves as a sterilization method of sterilizing a sterilization target by the sterilization apparatus according to the present embodiment. Note that, in the present specification, sterilizing means not only removing germs but also removing viruses. In addition, in the present specification, sterilizing means disinfecting viruses or germs. Therefore, the sterilization apparatus according to the present embodiment also serves as a disinfection apparatus that disinfects a disinfection target (sterilization target), and the sterilization method according to the present embodiment also serves as a disinfection method of disinfecting a disinfection target (sterilization target).

Figure 2:
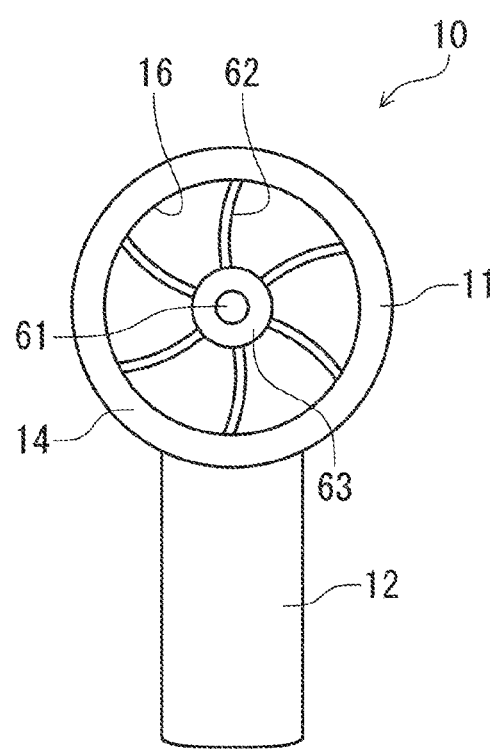
FIG. 2 is a schematic front view of the exemplary configuration of the sterilization apparatus according to the embodiment.
Figure 3:
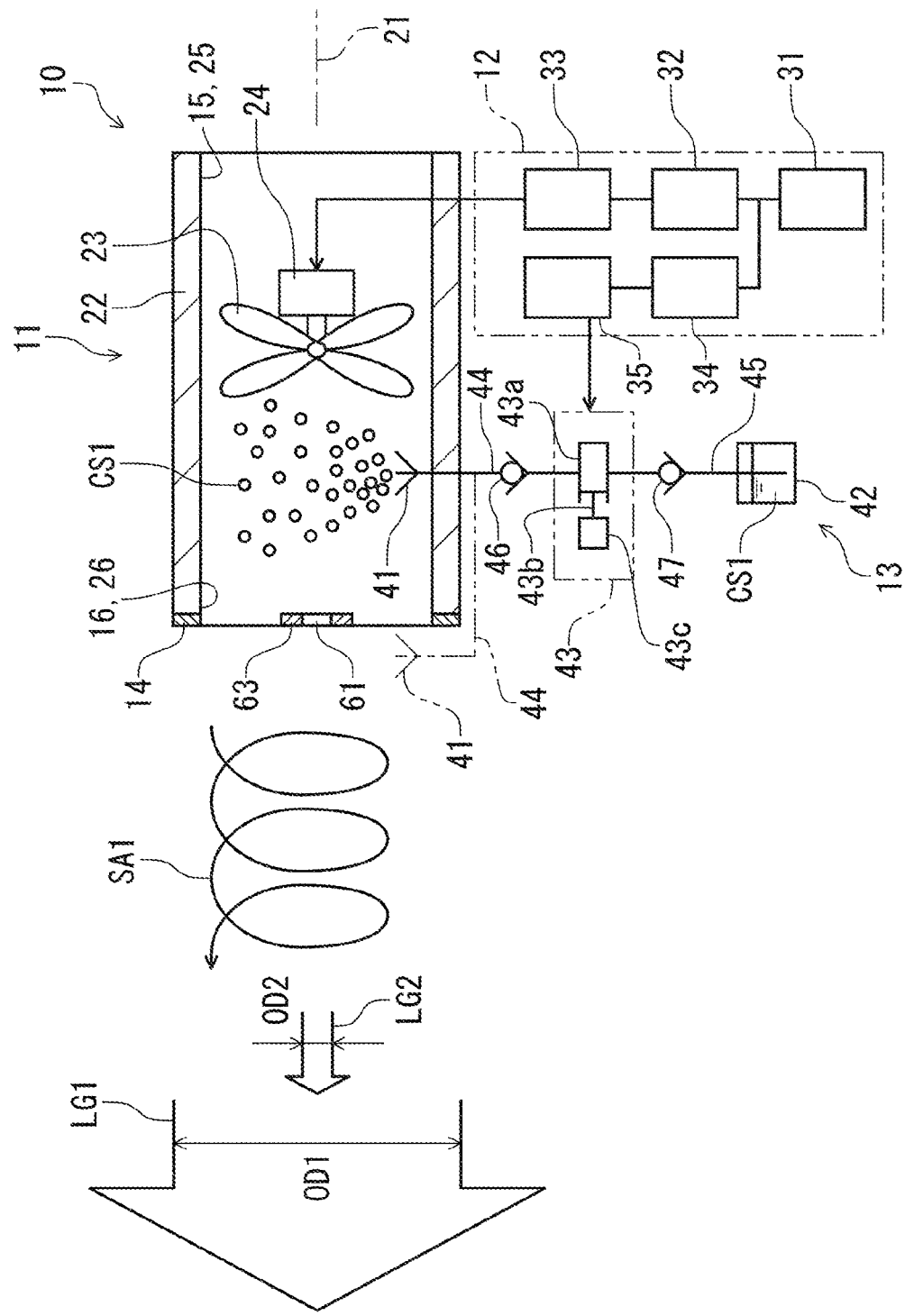
FIG. 3 is a schematic side view of the exemplary configuration of the sterilization apparatus according to the embodiment, the schematic side view being partially sectional.
Figure 4:
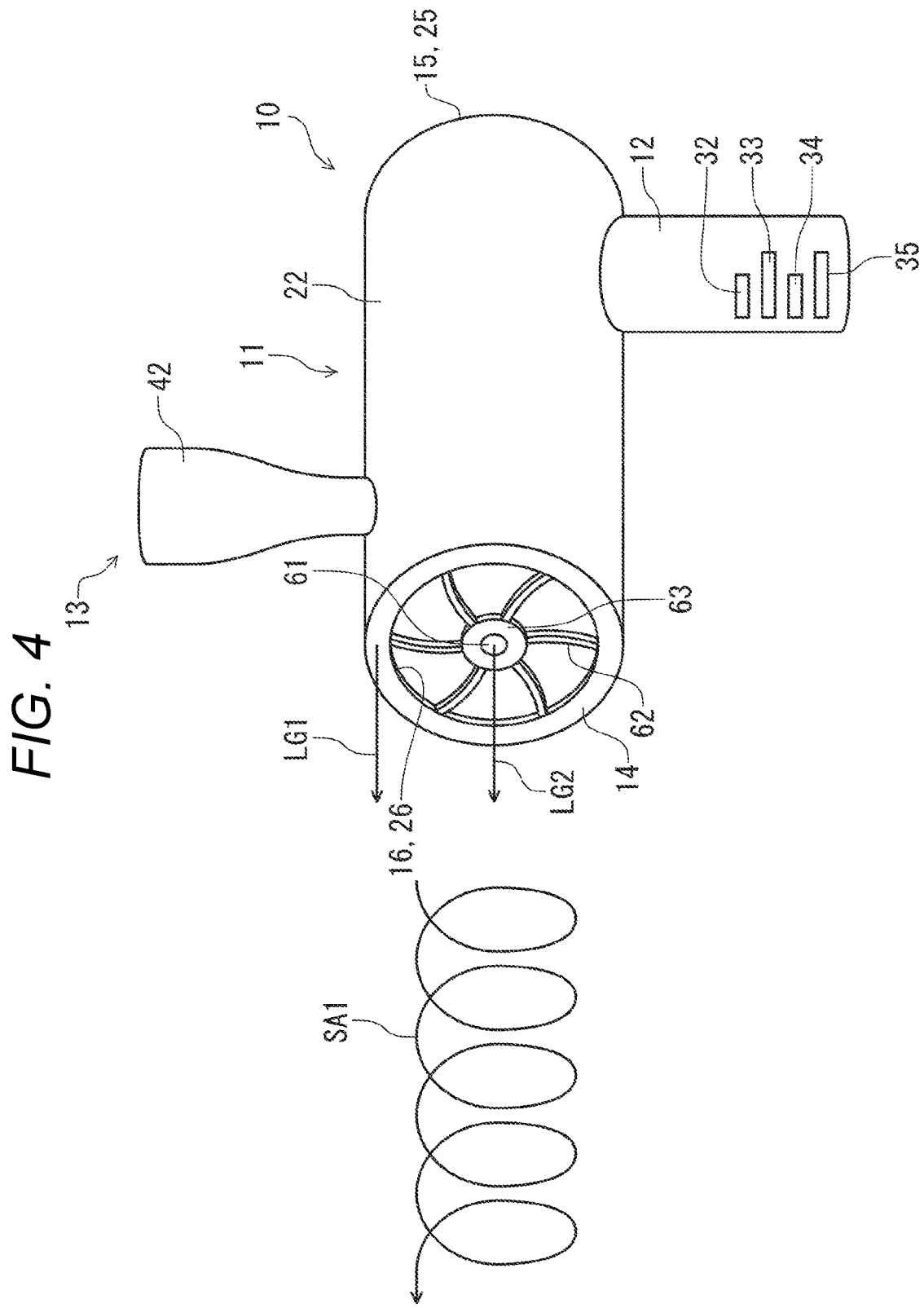
FIG. 4 is a schematic perspective view of another exemplary configuration of the sterilization apparatus according to the embodiment.

FIG. 1 is a schematic perspective view of an exemplary configuration of the sterilization apparatus according to the embodiment. FIG. 2 is a schematic front view of the exemplary configuration of the sterilization apparatus according to the embodiment. In FIG. 2, no atomizer is illustrated. FIG. 3 is a schematic side view of the exemplary configuration of the sterilization apparatus according to the embodiment, the schematic side view being partially sectional. In FIG. 3, for description of the respective configurations of a grip and an atomizer, part of the configuration of the sterilization apparatus according to the embodiment is given in a block diagram. FIG. 4 is a schematic perspective view of another exemplary configuration of the sterilization apparatus according to the embodiment.

Figure 5:
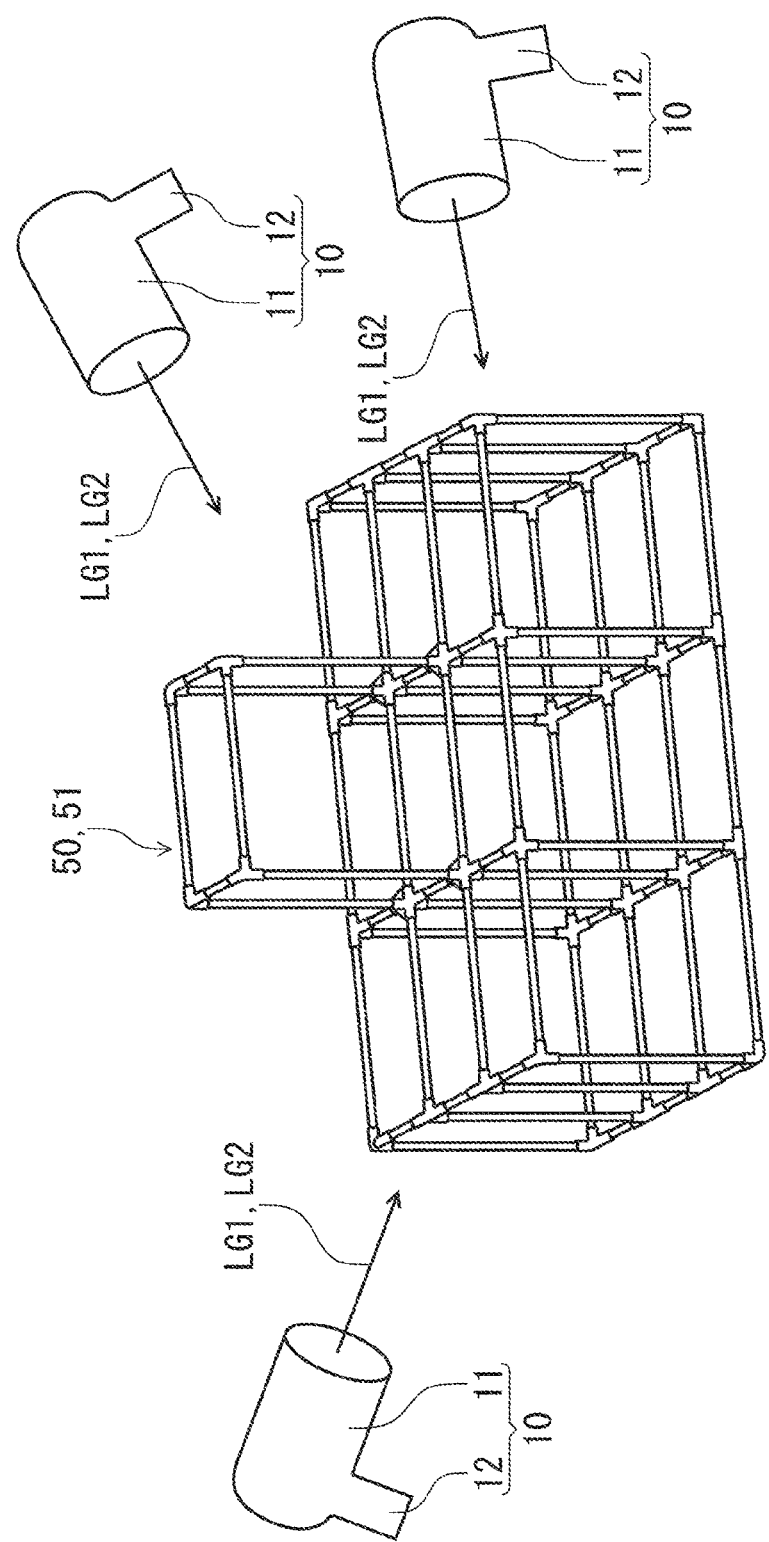
FIG. 5 is an explanatory view of a sterilization method by the sterilization apparatus according to the embodiment.
Figure 6:
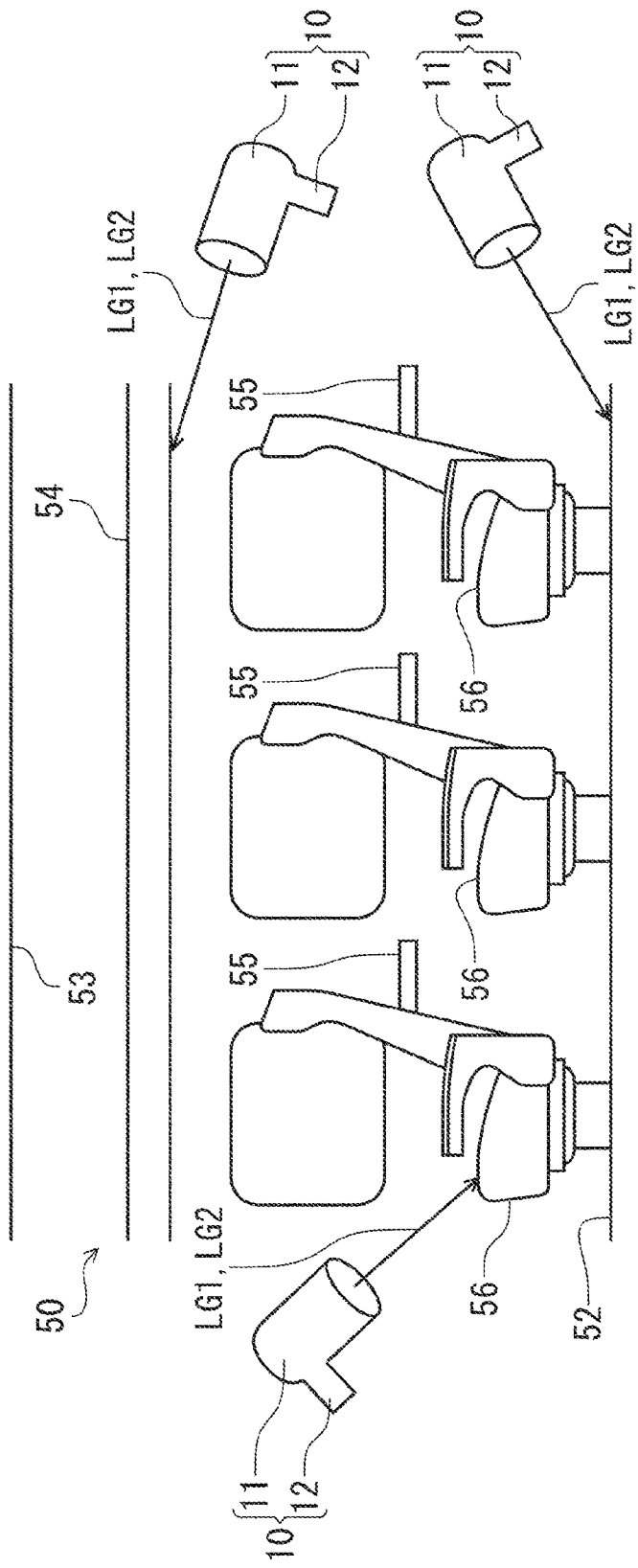
FIG. 6 is an explanatory view of the sterilization method by the sterilization apparatus according to the embodiment.

FIGS. 5 and 6 are explanatory views of the sterilization method by the sterilization apparatus according to the embodiment. FIG. 5 exemplifies a sterilization target that is playground equipment serving as a jungle gym. FIG. 6 exemplifies a sterilization target that is in-vehicle equipment in a bullet train. FIG. 7 is a flowchart of steps as part in the sterilization method according to the embodiment.

As illustrated in FIGS. 1 to 3, the sterilization apparatus 10 according to the present embodiment includes a fanner 11 as a blower (circulator), a grip 12, an atomizer 13, and a light emitter 14.

The fanner 11 has an inlet 15 through which air is inhaled and an outlet 16 from which the air is blown out, and blows out a spiral air current SA1 from the outlet 16. The atomizer 13 is provided at the fanner 11 and sprays a chemical solution CS1 for sterilization into the air to be blown out from the outlet 16 or into the spiral air current SA1 blown out from the outlet 16. The light emitter 14 is provided at the fanner 11 and emits light LG1 in the direction in which the spiral air current SA1 is blown out from the outlet 16.

Note that, as in a second modification of the embodiment to be described below, the atomizer 13 may spray the chemical solution CS1 directly on a sterilization target.

Specifically, the fanner 11 can include a barrel 22 centered with a central axis 21, a fan 23 provided rotatably around the central axis 21 inside the barrel 22, and a drive unit 24 that rotation-drives the fan 23. In such a case, the inlet 15 is provided at an end portion 25 in the direction along the central axis 21 of the barrel 22, namely, in the axial direction of the barrel 22, and the outlet 16 is provided at an end portion 26 opposite to the end portion 25 in the direction along the central axis 21 of the barrel 22, namely, in the axial direction of the barrel 22. The fan 23 inhales air through the inlet 15 and blows out, through the outlet 16, the air inhaled through the inlet 15. Note that the light emitter 14 is preferably provided at the end portion 26 of the fanner 11.

The grip 12 is disposed, for example, on the lower side of the barrel 22 and is in connection with the barrel 22. A worker who does sterilization work grips the grip 12 by hand, supporting the barrel 22. The grip 12 includes a power unit 31, a switch 32, an adjuster 33, a switch 34, and an adjuster 35. The power unit 31 supplies power to the drive unit 24 and the light emitter 14. The switch 32 serves as a first switch that turns on or off an electric circuit between the power unit 31 and the fan 23. For example, the adjuster 33 includes a variable resistor and adjusts the resistance value of the variable resistor to adjust the intensity of the spiral air current SA1 that is blown out from the outlet 16, namely, the air velocity or air volume of the spiral air current SA1. The switch 34 serves as a second switch that turns on or off an electric circuit between the power unit 31 and the atomizer 13. For example, the adjuster 35 includes a variable resistor and adjusts, for example, the resistance value thereof to adjust the amount of the chemical solution that the atomizer 13 sprays.

Note that the grip 12 is not necessarily provided. In such a case, a worker who does sterilization work retains the barrel 22, supporting the barrel 22.

As the atomizer 13, for example, a spray-type atomizer can be used. In such a case, the atomizer 13 includes a discharge head 41 that discharges the chemical solution CS1, a storage 42 that stores the chemical solution CS1, a supplier 43 that supplies the chemical solution CS1 stored in the storage 42 to the discharge head 41, a conduit 44 having one end connected to the supplier 43 and the other end connected to the discharge head 41, and a conduit 45 having one end connected to the storage 42 and the other end connected to the supplier 43. The chemical solution CS1 flows from the storage 42 to the supplier 43 inside the conduit 45, and flows from the supplier 43 to the discharge head 41 inside the conduit 44. On the conduit 44, provided is a backflow check valve that prevents the chemical solution CS1 from flowing backward from the discharge head 41 to the supplier 43, namely, a check value 46. On the conduit 45, provided is a backflow check valve that prevents the chemical solution CS1 from flowing backward from the supplier 43 to the storage 42, namely, a check valve 47.

The discharge head 41 is provided inside the barrel 22 or is provided outside the barrel 22 and on the side on which the end portion 26 of the barrel 22 is located. In a case where the discharge head 41 is provided inside the barrel 22, the discharge head 41 sprays the chemical solution CS1 for sterilization into the air to be blown out from the outlet 16. Meanwhile, in a case where the discharge head 41 is provided outside the barrel 22 and on the side on which the end portion 26 of the barrel 22 is located, the discharge head 41 sprays the chemical solution CS1 into the spiral air current SA1 blown out from the outlet 16.

For example, the supplier 43 includes a cylinder 43a, a piston 43b movable in the cylinder 43a, and a motor 43c that moves the piston 43b in the cylinder 43a. When the piston 43b moves outward in the cylinder 43a, the chemical solution CS1 is supplied from the storage 42 to the cylinder 43a. When the piston 43b moves inward in the cylinder 43a, the chemical solution CS1 is supplied from the cylinder 43a to the discharge head 41. In such a case, the switch 34 described above turns on or off the electric circuit between the power unit 31 and the motor 43c and the adjuster 35 adjusts, for example, the revolutions per minute of the motor 43c, resulting in an adjustment in the amount of the chemical solution CS1 that the discharge head 41 discharges.

According to the example in FIGS. 1 to 3, the storage 42 is disposed on the lower side of the barrel 22 and is in connection with the barrel 22. However, the storage 42 is not limited to being disposed on the lower side of the barrel 22. Therefore, as illustrated in FIG. 4, the storage 42 may be disposed on the upper side of the barrel 22. Note that, even either in a case where the storage 42 is disposed on the lower side of the barrel 22 or in a case where the storage 42 is disposed on the upper side of the barrel 22, as the atomizer 13, used can be a cartridge operated type/stored-pressure type atomizer used as a fire extinguisher, instead of a spray-type atomizer.

In the present embodiment, as the chemical solution CS1 for sterilization, used can be a chemical solution containing at least a sterilizing agent. Preferred examples of such a sterilizing agent (disinfectant) include an alcohol-based sterilizing agent, such as ethanol (ethyl alcohol) or isopropanol (isopropyl alcohol), an aldehyde-based sterilizing agent (disinfectant), such as glutaral, phtharal, or formalin, a chlorine-based sterilizing agent (disinfectant), such as sodium hypochlorite or hypochlorous acid water, an iodine-based sterilizing agent (disinfectant), such as povidone-iodine or iodine tincture, a phenol-based sterilizing agent (disinfectant), such as phenol or a saponated cresol solution, a quaternary-ammonium-salt-based sterilizing agent (disinfectant), such as benzalkonium chloride or benzethonium chloride, an amphoteric-surfactant-based sterilizing agent (disinfectant), such as alkyldiaminoethylglycine hydrochloride, a biguanide-based sterilizing agent (disinfectant), such as chlorhexidine gluconate, an oxidant-based sterilizing agent (disinfectant), such as peracetic acid or hydrogen peroxide, a pigment-based sterilizing agent (disinfectant), such as acrinol hydrate, and benzalkonium cetyl phosphate, triclosan, chloroxylenol, and isopropyl methylphenol.

For sterilization against enveloped viruses, such as coronaviruses, a chemical solution for sterilization containing such an alcohol-based sterilizing agent, such as ethanol, as above can be used. For sterilization against non-enveloped viruses, such as Norovirus, a chemical solution for sterilization containing such a chlorine-based sterilizing agent as above can be used.

Here, problems at the time of sterilization of a sterilization target will be described.

In various types of public services, such as means of public transport, or in other various types of business conditions, such as playground equipment providing services and service industries, such as restaurants, as work for sterilization, namely, disinfection against such viruses or germs as described above, a chemical solution for sterilization, namely, for disinfection is sprayed to adhere to a sterilization target and then the chemical solution adhering to the sterilization target is wiped off to sterilize the sterilization target.

Referring to FIG. 5 exemplifying a sterilization target 50 that is playground equipment 51 serving as a jungle gym, managed is a facility that is a playground for children and is termed a kids' corner, in which, for example, the playground is kept open for 10 minutes, then cleaning, namely, sterilization work is manually but carried out to the sterilization target 50 as the playground equipment 51 for 5 minutes with the playground temporarily closed, and again the playground is kept open for 10 minutes. Thus, a great deal of time is required for sterilization work, causing much labor on a worker who does sterilization work. Due to such requirement of much labor and a great deal of time as above, some facilities have closed down with difficulty in running.

Meanwhile, a train for carrying a large number of passengers is assumed as means of public transport. In such a train, if a large number of passengers touch handrails as in-vehicle equipment, touch metallic supports as in-vehicle equipment, touch seats as in-vehicle equipment, or cough or sneeze in an enclosed in-vehicle space, a large number of viruses or germs adhere to the in-vehicle equipment or float in the in-vehicle space. Replacement of the air in the in-vehicle space by ventilation enables removal of the viruses in the in-vehicle space (aerosolized state), but highly-frequent and regular cleaning, namely, highly-frequent and regular sterilization work is difficult to carry out to the viruses or germs adhering to the in-vehicle equipment.

Referring to FIG. 6 exemplifying a sterilization target 50 that is in-vehicle equipment in a bullet train, cleaning, namely, sterilization work is carried out to some extent to the vehicle equipment in the bullet train. However, in terms of time and in terms of expense, such as labor cost, cleaning, namely, sterilization work is difficult to carry out for sufficient sterilization of the entire sterilization target, in which a chemical solution for sterilization is made to adhere to the entire in-vehicle equipment including a floor 52, a ceiling 53, a luggage rack 54, and seats 56 each equipped with a table 55, and then the chemical solution adhering to the in-vehicle equipment is wiped off.

Thus, in the various types of public services or in the various types of business conditions described above, much labor is required for sterilization work in which a chemical solution for sterilization, namely, for disinfection is sprayed to adhere to a sterilization target and then the chemical solution adhering to the sterilization target is wiped off to clean off the viruses or germs adhering to the sterilization target, resulting in sterilization of the sterilization target. That is, in order to sterilize the sterilization target sufficiently, highly-frequent and regular sterilization work is required. Considerable time is required for one flow of sterilization work. Therefore, it is difficult to sterilize the sterilization target promptly and sufficiently.

According to the respective technologies in JP 2018-51186 A and JP 2019-119704 A above, the medication can be diffused into the air sent by the blower. However, according to the respective technologies in JP 2018-51186 A and JP 2019-119704 A above, because an air current blown out from the blower has difficulty in traveling straight, even when a sterilizing agent is diffused into the air sent by the blower, reliable blowing of the sterilizing agent on a sterilization target and prompt removal of the sterilizing agent blown on the sterilization target are difficult to perform.

According to the technology in JP 2019-152105 A above, illumination in the sending direction of wind from the air outlet can be achieved by the light source. However, according to the technology in JP 2019-152105 A above, because an air current blown out from the blower has difficulty in traveling straight, even when illumination in the sending direction of wind from the air outlet is performed by the light source, reliable blowing of a sterilizing agent on a sterilization target and prompt removal of the sterilizing agent blown on the sterilization target are difficult to perform.

Meanwhile, the sterilization apparatus 10 according to the present embodiment includes the fanner 11 that blows out the spiral air current SA1 from the outlet 16, the atomizer 13 that sprays the chemical solution CS1 for sterilization, and the light emitter 14 that emits the light LG1 in the direction in which the spiral air current SA1 is blown out from the outlet 16.

A case where the spiral air current SA1 spiral in shape is blown out from the outlet 16 excels a case where any air current not spiral in shape is blown out in that an air current travels straight easily without expanding. That is, the spiral air current SA1 excels other air currents not spiral in shape, in straightness. Thus, the outer diameter of the spiral air current SA1 blown out from the outlet 16 of the fanner 11 can be prevented or inhibited from increasing along with an increase in the distance from the fanner 11. Therefore, even in a case where the fanner 11 is considerably distant from the sterilization target 50, the spiral air current SA1 can be blown on the sterilization target 50 reliably.

That is, the sterilization apparatus according to the present embodiment is achieved, for example, by a blower having a sterilization function, namely, a disinfection function or a circulator that is higher in straightness in order to blow out gas and liquid straight and further has a sterilization function, namely, a disinfection function.

Whether or not the spiral air current SA1 blown out from the outlet 16 has been blown on the sterilization target 50 can be visually verified more easily in a case where the light LG1 is emitted in the direction in which the spiral air current SA1 is blown out from the outlet 16 than in a case where no light LG1 is emitted in the direction in which the spiral air current SA1 is blown out from the outlet 16.

Sterilization work in such a case as above is less in labor in the various types of public services or in the various types of business conditions described above than sterilization work in which a chemical solution for sterilization, namely, for disinfection is sprayed to adhere to a sterilization target and then the chemical solution adhering to the sterilization target is wiped off to clean off the viruses or germs adhering to the sterilization target, resulting in sterilization of the sterilization target. Thus, even in a case where highly-frequent and regular sterilization work is carried out in order to sterilize the sterilization target sufficiently, one flow of sterilization work is not so long in time. Therefore, reliable blowing of a sterilizing agent on the sterilization target and prompt removal of the sterilizing agent blown on the sterilization target can be achieved, so that the sterilization target can be sterilized promptly and sufficiently.

Referring to FIG. 5 exemplifying the sterilization target 50 that is the playground equipment 51 serving as a jungle gym, the sterilization apparatus according to the present embodiment does not require a great deal of time for sterilization work and much labor on a worker who does sterilization work, even in a facility that is a playground for children and is termed a kids' corner. With sterilization against viruses or germs, easily achieved can be management in which, for example, the playground is kept open for 10 minutes, then cleaning, namely, sterilization work is manually kept carried out to the sterilization target 50 as the playground equipment 51 for 5 minutes with the playground temporarily closed, and again the playground is kept open for 10 minutes. Due to such no requirement of much labor and a great deal of time as above, many facilities can continue without difficulty in running.

Referring to FIG. 6 exemplifying the sterilization target 50 that is in-vehicle equipment in a bullet train, the sterilization apparatus according to the present embodiment enables, in the bullet train, easy adhesion of the chemical solution for sterilization to the entire in-vehicle equipment including the floor 52, the ceiling 53, the luggage rack 54, and the seats 56 each equipped with the table 55, thereafter the chemical solution adhering to the in-vehicle equipment can be removed easily without wiping off. Thus, in terms of time and in terms of expense, such as labor cost, cleaning, namely, sterilization work can be carried out easily for sufficient sterilization of the entire sterilization target.

Note that, with no chemical solution for sterilization, only blowing air on a sterilization target may blow away viruses or germs from the sterilization target into the air. Thus, a step of blowing the spiral air current not containing such an alcohol-based sterilizing agent or chlorine-based sterilizing agent as described above on a sterilization target or a step of blowing the spiral air current containing a sterilizing agent on a sterilization target can be selectively performed.

The life span of the novel coronavirus (COVID-19) depends on the material of an object to which the novel coronavirus (COVID-19) adheres. In a case where the material is, for example, cardboard, the life span of the novel coronavirus (COVID-19) is approximately 24 hours. In a case where the material is, for example, plastic or stainless steel, the life span of the novel coronavirus (COVID-19) is approximately 2 to 3 days. Meanwhile, in a case where the novel coronavirus (COVID-19) is floating in the air, namely, the novel coronavirus (COVID-19) has been aerosolized, the life span of the novel coronavirus (COVID-19) is approximately 3 hours. Therefore, performing a step of blowing away the viruses or germs adhering to a sterilization target from the sterilization target into the air and a step of ventilating the space in which the sterilization target is provided, in combination is effective.

In addition, preferred examples of the sterilization target 50 that the sterilization apparatus 10 according to the present embodiment sterilizes include playground equipment in kids' corners, parks, and amusement parks, means of public transport, such as buses, trains, and bullet trains, benches in parks and on sidewalks, vending machines, and desks and chairs in meeting rooms.

Next, a preferred example of the sterilization apparatus 10 according to the present embodiment and the sterilization method by the sterilization apparatus 10 according to the present embodiment will be described.

Preferably, the chemical solution CS1 contains a sterilizing agent and a fluorescent agent that emits visible light or colors due to irradiation with ultraviolet light. The light LG1 includes ultraviolet light (ultraviolet rays). Note that, in the present specification, ultraviolet light (ultraviolet rays) means electromagnetic waves including invisible rays having wavelengths of 10 to 400 nm, and visible light means electromagnetic waves having visible wavelengths, namely, electromagnetic waves having wavelengths the lower bound (lower limit in the range) and upper bound (upper limit in the range) of which are approximately 360 to 400 nm and approximately 760 to 830 nm, respectively.

In such a case, irradiation of the sterilization target 50 with the light LG1 including the ultraviolet light enables easy visual verification of whether or not the fluorescent agent has adhered to the sterilization target 50. Thus, whether or not the chemical solution CS1 containing the fluorescent agent has adhered to the sterilization target 50 can be easily verified, so that whether or not the sterilizing agent contained in the chemical solution CS1 has adhered to the sterilization target 50 can be easily verified.

In such a case, preferably, with the atomizer 13 spraying the chemical solution CS1, the fanner 11 blows out the spiral air current SA1 from the outlet 16, to blow the spiral air current SA1 containing the sterilizing agent and the fluorescent agent on the sterilization target 50, so that the sterilizing agent and the fluorescent agent contained in the spiral air current SA1 blown on the sterilization target 50 adhere to the sterilization target 50 and the sterilizing agent adhering to the sterilization target 50 sterilizes the sterilization target 50 (step S1 of FIG. 7).

The light emitter 14 irradiates the fluorescent agent adhering to the sterilization target 50 with the light LG1 including the ultraviolet light, to cause the fluorescent agent to glow or to color (step S2 of FIG. 7).

In step S1 of FIG. 7, the chemical solution CS1 adheres to the sterilization target 50, so that the fluorescent agent contained in the chemical solution CS1 adheres to the sterilization target 50. Thus, in step S2 of FIG. 7, irradiation of the sterilization target 50 with the light LG1 including the ultraviolet light enables easy visual verification of whether or not the fluorescent agent has adhered to the sterilization target 50. Therefore, whether or not the chemical solution CS1 containing the fluorescent agent has adhered to the sterilization target 50 can be easily verified, so that whether or not the sterilizing agent contained in the chemical solution CS1 has adhered to the sterilization target 50 can be easily verified.

Note that step S2 of FIG. 7 may be performed simultaneously with step S1 of FIG. 7 or may be performed after step S1.

Preferably, after the atomizer 13 sprays the chemical solution CS1, the fanner 11 blows out the spiral air current SA1 from the outlet 16 with the atomizer 13 having stopped spraying the chemical solution CS1, to blow the blown spiral air current SA1 on the sterilization target 50, so that the sterilizing agent adhering to the sterilization target 50 evaporates or is blown away (step S3 of FIG. 7).

In such a case, after the sterilizing agent adheres to the sterilization target 50 due to step S1 of FIG. 7, the spiral air current SA1 is blown on the sterilization target 50 with the atomizer 13 having stopped spraying the chemical solution CS1, so that the sterilizing agent adhering to the sterilization target 50 can be removed in a short time. Thus, the work of sterilizing the sterilization target with the sterilization apparatus 10 can be efficiently carried out, resulting in an increase in the surface area of a part to be sterilized per unit time in the sterilization target 50.

According to the preferred example above, sterilization work can be carried out in the order of "blowing the chemical solution containing the fluorescent agent on the sterilization target", "irradiating the sterilization target with the ultraviolet light (ultraviolet rays) and visually verifying fluorescence", "blowing away the chemical solution adhering to the sterilization target", and "irradiating the sterilization target with the ultraviolet light and verifying that no fluorescence has been visually observed". That is, the chemical solution CS1, which contains the fluorescent agent as a fluorescent substance mixable with the sterilizing agent, adhering to the sterilization target 50 is irradiated with the light LG1 including the ultraviolet light, namely, black light, and fluorescence radiated from the fluorescent substance irradiated with the light LG1 is visually verified. After that, air is blown on the sterilization target 50 to blow away the chemical solution CS1 adhering to the sterilization target 50. Furthermore, the sterilization target 50 is irradiated with the ultraviolet light again, so that it can be visually verified that no chemical solution CS1 has adhered to the sterilization target 50. Therefore, a worker who does sterilization work can carry out sterilization work while visually verifying whether or not the sterilization target 50 has been sterilized reliably, namely, whether or not the sterilization target 50 has been cleaned reliably.

Preferably, the fluorescent agent is a fluorescent agent contained in food or a fluorescent agent used in food, and examples thereof include phloxine and riboflavin (vitamin B2).

Because such a fluorescent agent is a fluorescent agent contained in food or a fluorescent agent used in food, even in a case where the fluorescent agent adhering to the sterilization target is accidentally taken into the mouth of a user who uses the sterilization target or the mouth of a worker who does sterilization work for sterilization of the sterilization target, directly or indirectly through a hand or the like, the health of the user or worker is not damaged.

Alternatively, preferably, the fluorescent agent is a volatile fluorescent dye, and examples thereof that can be used include 4-Dimethylaminobenzaldehyde (DMAB) and 4-Dimethylaminocinnamaldehyde (DMAC).

As described above, assumed is a case where the fanner blows out the spiral air current to blow the blown spiral air current on the sterilization target, so that the sterilizing agent adhering to the sterilization target evaporates or is blown away. In such a case, if the fluorescent agent is such a volatile fluorescent dye as above, similarly to the sterilizing agent adhering to the sterilization target, the entirety or part of the fluorescent agent adhering to the sterilization target can be easily removed by evaporation. Thus, irradiation of the fluorescent agent adhering to the sterilization target with the light LG1 from the light emitter 14 enables easy visual observation of whether or not the fluorescent agent has evaporated and been removed.

Note that, in the present embodiment, the fluorescent agent is not limited to a volatile fluorescent dye. In such a case, after the work of sterilizing the sterilization target is carried out, the fluorescent agent adhering to the sterilization target can be gradually removed along with the elapse of time.

Preferably, the sterilization apparatus 10 according to the present embodiment includes a light emitter 61. The light emitter 61 is provided at the fanner 11 and emits light LG2 including visible light in the direction in which the spiral air current SA1 is blown out from the outlet 16. Note that the light emitter 61 is preferably provided at the end portion 26 of the fanner 11, similarly to the light emitter 14.

In such a case, the relative position of the fanner 11 to the sterilization target 50 is adjusted such that the sterilization target 50 is irradiated with the light LG2 emitted by the light emitter 61. That is, irradiation of the sterilization target 50 with the light LG2 including the visible light enables easy visual verification of whether or not the spiral air current SA1 blown out from the outlet 16 has been blown on the sterilization target 50. In addition, the spiral air current SA1 blown out from the outlet 16 of the fanner 11 can be blown on the sterilization target 50 reliably.

In such a case, preferably, in step S1 of FIG. 7, with the light emitter 61 irradiating the sterilization target 50 with the light LG2 and the atomizer 13 spraying the chemical solution CS1, the fanner 11 blows out the spiral air current SA1 from the outlet 16, to blow the spiral air current SA1 containing the sterilizing agent and the fluorescent agent on the sterilization target 50, so that the sterilizing agent and the fluorescent agent contained in the spiral air current SA1 blown on the sterilization target 50 adhere to the sterilization target 50 and the sterilizing agent adhering to the sterilization target 50 sterilizes the sterilization target 50.

Thus, with the sterilization target 50 being irradiated with the light LG2, the spiral air current SA1 containing the sterilizing agent and the fluorescent agent is blown on the sterilization target 50, so that the spiral air current SA1 can be blown on the sterilization target 50 more reliably.

Preferably, the light emitter 61 is achieved by a laser diode or a light emitting diode (LED) that emits visible light as the light LG2.

The straightness of light that is emitted by laser diodes or light emitting diodes is higher than the straightness of light that is emitted by any other light sources different in type therefrom. Thus, due to the light emitter 61 achieved by a laser diode or a light emitting diode that emits visible light, whether or not the spiral air current SA1 blown out from the outlet 16 of the fanner 11 will reach (arrive at) the sterilization target 50 straight can be visually verified more easily.

That is, sterilization work can be carried out with feedback on information as to whether or not a desired position on the surface of the sterilization target 50 is irradiated with the light LG2 emitted by the light emitter 61. Sterilization work is carried out with visual verification of whether or not fluorescence is radiated, with the sterilization target being irradiated with the ultraviolet light after the sterilizing agent and the fluorescent agent as a fluorescent substance in mixture are blown on the sterilization target. Thus, the progress of sterilization work can be easily verified, resulting in a further improvement in the efficiency of sterilization work.

Preferably, the outer diameter OD1 of the light LG1 that the light emitter 14 emits is larger than the outer diameter OD2 of the light LG2 that the light emitter 61 emits.

In such a case, because the outer diameter OD2 of the light LG2 is smaller than the outer diameter OD1 of the light LG1, the relative position of the fanner 11 to the sterilization target 50 can be accurately adjusted such that the sterilization target 50 is irradiated with the light LG2 emitted by the light emitter 61. Thus, the spiral air current SA1 blown out from the outlet of the fanner 11 can be blown on the sterilization target 50 more reliably. Because the outer diameter OD1 of the light LG1 is larger than the outer diameter OD2 of the light LG2, whether or not the sterilizing agent has adhered to the sterilization target 50 can be verified over a wide area. Thus, the work of sterilizing the sterilization target 50 with the sterilization apparatus 10 can be efficiently carried out, resulting in an increase in the surface area of a part to be sterilized per unit time in the sterilization target 50.

Preferably, when viewed in the axial direction of the barrel 22, the light emitter 14 is annular in shape, surrounding the circumference of the light emitter 61.

Thus, the outer diameter OD2 of the light LG2 can be easily made smaller than the outer diameter OD1 of the light LG1 with easy arrangement of the light emitter 14 and the light emitter 61, so that the spiral air current SA1 blown out from the outlet 16 of the fanner 11 can be blown on the sterilization target 50 more reliably. The outer diameter OD1 of the light LG1 can be easily made larger than the outer diameter OD2 of the light LG2, so that whether or not the sterilizing agent has adhered to the sterilization target 50 can be verified over a wider area at a time.

Preferably, the fanner 11 includes a grille 63 that is provided at the outlet 16 and has a plurality of openings 62 each having a curled shape curling clockwise or counterclockwise when viewed in the axial direction of the barrel 22. The plurality of openings 62 each passes through the grille 63 in the axial direction of the barrel 22.

The plurality of openings 62 of the grille 63, each having a curled shape curling clockwise or counterclockwise enables the spiral air current SA1 spiral in shape to be blown out more easily than the plurality of openings 62 of the grille 63, each not having a curled shape curling clockwise or counterclockwise.

Note that, when viewed from the sterilization target 50 toward the fanner 11, the direction of rotation of the curled shapes of the openings 62 of the grille 63, the direction of rotation of the spiral air current SA1 blown out by the fanner 11, and the direction of rotation of the fan 23 are identical.

The light emitter 14 annular in shape, surrounding the circumference of the light emitter 61, when viewed in the axial direction of the barrel 22, corresponds to the light emitter 14 annular in shape, surrounding the circumference of the parts corresponding to the openings 62 of the grille 63, when viewed in the axial direction of the barrel 22. Meanwhile, in a case where the sterilization apparatus 10 according to the present embodiment includes no light emitter 61, when viewed in the axial direction of the barrel 22, the light emitter 14 may be annular in shape, surrounding the circumference of the parts corresponding to the openings 62 of the grille 63, so that the outer diameter OD1 of the light LG1 can be easily made larger than the outer diameter of the parts corresponding to the openings 62 of the grille 63. Thus, whether or not the sterilizing agent has adhered to the sterilization target 50 can be verified over a wider area at a time.

<Sterilization Apparatus According to First Modification>

Next, a sterilization apparatus according to a first modification of the embodiment will be described. The sterilization apparatus 10 according to the first modification is different from the sterilization apparatus 10 according to the embodiment in that a light emitter 14 emits light LG3 including visible light, instead of light LG1 including ultraviolet light.

FIG. 8 is a schematic perspective view of the configuration of the sterilization apparatus according to the first modification of the embodiment. FIG. 9 is a flowchart of steps as part in a sterilization method according to the first modification of the embodiment.

As illustrated in FIG. 8, similarly to the embodiment, in the first modification, an atomizer 13 is provided at a fanner 11 and sprays a chemical solution CS1 into air to be blown out from an outlet 16 or into a spiral air current SA1 blown out from the outlet. Similarly to the embodiment, in the first modification, the light emitter 14 is provided at the fanner 11, preferably, at an end portion 26 of the fanner 11.

Meanwhile, differently from the embodiment, in the first modification, as described above, the light emitter 14 emits the light LG3 including the visible light, instead of the light LG1 including the ultraviolet light (refer to FIG. 1).

In such a case, the relative position of the fanner 11 to a sterilization target 50 (refer to FIG. 5) is adjusted such that the sterilization target 50 is irradiated with the light LG3 emitted by the light emitter 14. That is, irradiation of the sterilization target 50 with the light LG3 including the visible light enables easy visual verification of whether or not the spiral air current SA1 blown out from the outlet 16 is blown on the sterilization target 50. In addition, the spiral air current SA1 blown out from the outlet 16 of the fanner 11 can be blown on the sterilization target 50 reliably.

Note that, in the first modification, the chemical solution CS1 is required to contain a sterilizing agent but does not necessarily contain any fluorescent agent.

In such a case, preferably, in a step corresponding to step S1 of FIG. 7, with the light emitter 14 irradiating the sterilization target 50 (refer to FIG. 5) with the light LG3 including the visible light and the atomizer 13 spraying the chemical solution CS1 (refer to FIG. 3), the fanner 11 blows out the spiral air current SA1 from the outlet 16, to blow the spiral air current SA1 containing a sterilizing agent and a fluorescent agent on the sterilization target 50, so that the sterilizing agent and the fluorescent agent contained in the spiral air current SA1 blown on the sterilization target 50 adhere to the sterilization target 50 and the sterilizing agent adhering to the sterilization target 50 sterilizes the sterilization target 50 (step S11 of FIG. 9).

Thus, with the sterilization target 50 (refer to FIG. 5) being irradiated with the light LG3, the spiral air current SA1 containing the sterilizing agent and the fluorescent agent is blown on the sterilization target 50, so that the spiral air current SA1 can be blown on the sterilization target 50 more reliably.

Differently from the embodiment, in the first modification, after step S11 of FIG. 9, a step corresponding to step S3 of FIG. 7 is performed with no step corresponding to step S2 of FIG. 7. In the step corresponding to step S3 of FIG. 7, after the atomizer 13 sprays the chemical solution CS1 (refer to FIG. 3), the fanner 11 blows out the spiral air current SA1 from the outlet 16 with the atomizer 13 having stopped spraying the chemical solution CS1, to blow the blown spiral air current SA1 on the sterilization target 50, so that the sterilizing agent adhering to the sterilization target 50 evaporates or is blown away (step S12 of FIG. 9).

Note that, similarly to the sterilization apparatus 10 according to the first modification, the sterilization apparatus 10 according to the embodiment may include a single light emitter 14, in which the single light emitter 14 may emit ultraviolet light and visible light. That is, a single light emitter may be provided to serve as the light emitter 14 (refer to FIG. 1) that emits the light LG1 including the ultraviolet light (refer to FIG. 1) and the light emitter 61 (refer to FIG. 1) that emits the light LG2 including the visible light (refer to FIG. 1).

<Sterilization Apparatus According to Second Modification>

Next, a sterilization apparatus according to a second modification of the embodiment will be described. The sterilization apparatus according to the second modification is different from the sterilization apparatus according to the embodiment in that an atomizer has a discharge head disposed ahead of a barrel, instead of being disposed in the barrel or on the periphery of the barrel, such that a chemical solution can be directly sprayed on a sterilization target.

Figure 10:
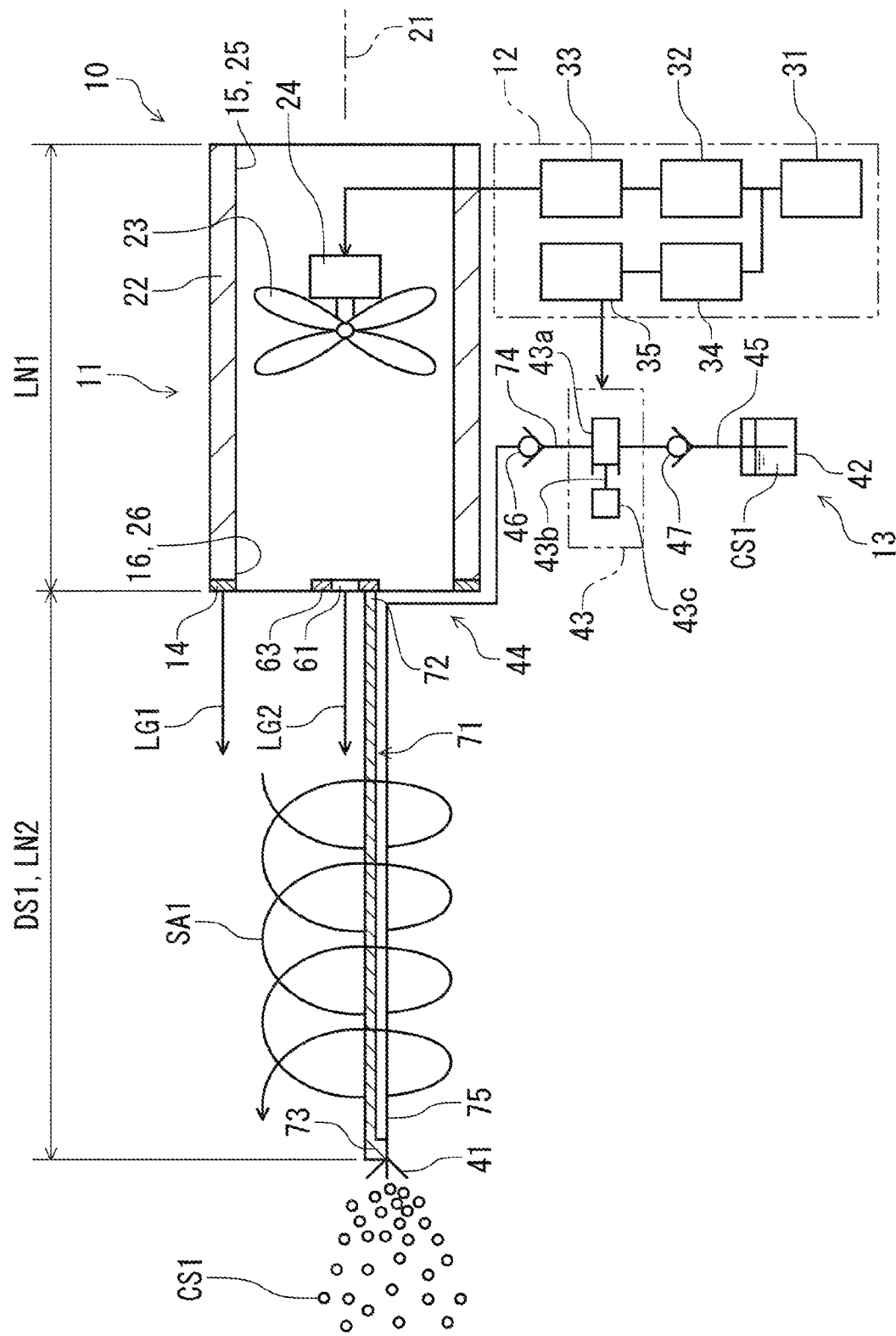
FIG. 10 is a schematic side view of an exemplary configuration of a sterilization apparatus according to a second modification of the embodiment, the schematic side view being partially sectional.

FIG. 10 is a schematic side view of an exemplary configuration of the sterilization apparatus according to the second modification of the embodiment, the schematic side view being partially sectional. FIG. 11 is a flowchart of steps as part in a sterilization method according to the second modification of the embodiment.

As illustrated in FIG. 10, similarly to the embodiment, in the second modification, a fanner 11 can include a barrel 22 centered with a central axis 21, a fan 23 provided rotatably around the central axis 21 inside the barrel 22, and a drive unit 24 that rotation-drives the fan 23. In such a case, an inlet 15 is provided at an end portion 25 in the direction along the central axis 21 of the barrel 22, namely, in the axial direction of the barrel 22, and an outlet 16 is provided at an end portion 26 opposite to the end portion 25 in the direction along the central axis 21 of the barrel 22, namely, in the axial direction of the barrel 22. The fan 23 inhales air through the inlet 15 and blows out, through the outlet 16, the air inhaled through the inlet 15.

Differently from the embodiment, in the second modification, an atomizer 13 includes a support 71 in addition to a discharge head 41 that discharges a chemical solution CS1, a storage 42 that stores the chemical solution CS1, a supplier 43 that supplies the chemical solution CS1 stored in the storage 42 to the discharge head 41, a conduit 44, and a conduit 45.

Differently from the embodiment, in the second modification, the discharge head 41 is disposed outside the end portion 26 in the axial direction of the barrel 22. The support 71 includes an end portion 72 and an end portion 73 opposite to the end portion 72. The end portion 72 is connected to the end portion 26 of the barrel 22, and the end portion 73 supports the discharge head 41. The conduit 44 includes an end portion 74 and an end portion 75 opposite to the end portion 74. The end portion 74 is connected to the supplier 43, and the end portion 75 is connected to the discharge head 41. The chemical solution CS1 flows from the end portion 74 to the end portion 75 inside the conduit 44.

In the second modification, as described above, the atomizer 13 sprays the chemical solution CS1 directly on a sterilization target 50 (refer to FIG. 5). Thus, even in a case where the chemical solution CS1 containing a sterilizing agent high in volatility, such as ethanol, is used, the sterilizing agent contained in the chemical solution CS1 can be made to adhere to the sterilization target 50 reliably.

Note that, similarly to the embodiment, in the second modification, as the chemical solution CS1, used can be a chemical solution containing a sterilizing agent and a fluorescent agent that emits visible light or colors due to irradiation with ultraviolet light. In such a case, if the sterilizing agent in the chemical solution is high in volatility, such as ethanol, the chemical solution CS1 can be effectively made to adhere to the sterilization target 50 (refer to FIG. 5) reliably.

Differently from the embodiment, in the second modification, in a step corresponding to step S1 of FIG. 7, the atomizer 13 sprays the chemical solution CS1 on the sterilization target 50 (refer to FIG. 5), to blow the chemical solution CS1 containing the sterilizing agent and the fluorescent agent on the sterilization target 50, so that the sterilizing agent and the fluorescent agent contained in the chemical solution CS1 blown on the sterilization target 50 adhere to the sterilization target 50 and the sterilizing agent adhering to the sterilization target 50 sterilizes the sterilization target 50 (step S21 of FIG. 11).

Note that, similarly to the embodiment, in a step corresponding to step S2 of FIG. 7, a light emitter 14 irradiates the fluorescent agent adhering to the sterilization target 50 (refer to FIG. 5) with light LG1 including ultraviolet light, to cause the fluorescent agent to glow or to color (step S22 of FIG. 11).

Differently from the embodiment, in the second modification, a spiral air current SA1 containing the sterilizing agent and the fluorescent agent is not blown on the sterilization target 50 (refer to FIG. 5) but the chemical solution CS1 is sprayed directly on the sterilization target 50. Thus, even in a case where the chemical solution CS1 containing a sterilizing agent high in volatility, such as ethanol, is used, the sterilizing agent contained in the chemical solution CS1 can be made to adhere to the sterilization target 50.

Differently from the embodiment, in the second modification, in a step corresponding to step S3 of FIG. 7, preferably, after the atomizer 13 sprays the chemical solution CS1, the fanner 11 blows out the spiral air current SA1 from the outlet 16 with the atomizer 13 having stopped spraying the chemical solution CS1, to blow the blown spiral air current SA1 on the sterilization target 50 (refer to FIG. 5), so that the sterilizing agent adhering to the sterilization target 50 evaporates or is blown away (step S23 of FIG. 11).

In such a case, after the sterilizing agent adheres to the sterilization target 50 (refer to FIG. 5) due to step S21 of FIG. 11, the spiral air current SA1 is blown on the sterilization target 50 with the atomizer 13 having stopped spraying the chemical solution CS1, so that the sterilizing agent adhering to the sterilization target 50 can evaporate or be blown away promptly. Thus, the work of sterilizing the sterilization target 50 with the sterilization apparatus 10 can be efficiently carried out, resulting in an increase in the surface area of a part to be sterilized per unit time in the sterilization target 50.

Preferably, the distance DS1 between the discharge head 41 and the end portion 26 in the axial direction of the barrel 22 is longer than the length LN1 of the barrel 22 in the axial direction of the barrel 22. That is, the distance between the discharge head 41 and the barrel 22 is at least longer than the length LN1 of the barrel 22 in the axial direction of the barrel 22. In other words, the length LN2 of the support 71 between the end portion 72 and the end portion 73 of the support 71 is longer than the length LN1 of the barrel 22 in the axial direction of the barrel 22.

In such a case, when the side on which the spiral air current SA1 is blown out from the fanner 11 is defined as the front side and the direction in which the spiral air current SA1 is blown out from the fanner 11 is defined as the front, the discharge head 41 can be disposed at a sufficient distance from the front side of the fanner 11, namely, the front of the fanner 11, so that the discharge head 41 can be made closer to the sterilization target 50 (refer to FIG. 5) reliably.

Even in a case where the discharge head 41 is disposed at a sufficient distance from the front side of the fan 23, namely, the front of the fan 23, the length LN1 of the barrel 22 in the axial direction of the barrel 22 is not required to be as long as the length LN2 of the support 71 between the end portion 72 and the end portion 73 of the support 71, so that the chemical solution CS1 can be sprayed on the sterilization target 50 (refer to FIG. 5) reliably and the fanner 11 can be easily reduced in weight. Similarly to the embodiment, because the spiral air current SA1 is blown out from the outlet 16 of the fanner 11, even in a case where the end portion 26 of the barrel 22 is considerably away from the sterilization target 50, the spiral air current SA1 can be blown on the sterilization target 50 reliably.

Note that one type of sterilization apparatus or a plurality of types of sterilization apparatuses can be appropriately combined from the sterilization apparatus according to the embodiment and the sterilization apparatuses according to the first modification and the second modification of the embodiment.

The invention made by the present inventor has been specifically described above on the basis of the embodiment. Needless to say, the present invention is not limited to the embodiment, and thus various alterations can be made without departing from the scope of the gist of the present invention.

In the scope of the idea of the present invention, various types of alterations and modifications may be conceived by those skilled in the art. It should be understood that such alterations and modifications belong to the scope of the present invention.

For example, without departing from the scope of the gist of the present invention, appropriate additions and deletions in constituent element, changes in design, additions and omissions in step, and changes in condition by those skilled in the art to the embodiment and the modifications described above are to be included in the scope of the present invention.

The present invention is effectively applied to a sterilization apparatus that sterilizes a sterilization target and a sterilization method of sterilizing a sterilization target.

What is claimed is:

1. A sterilization apparatus configured to sterilize a sterilization target, the sterilization apparatus comprising:
    a fanner comprising an inlet through which air is inhaled, an outlet from which the air is blown out, and a grille provided at the outlet, the fanner being configured to blow out a spiral air current from the outlet in an outlet direction;
    an atomizer configured to spray a chemical solution for sterilization into the air to be blown out from the outlet into the spiral air current blown out from the outlet in the outlet direction, or on the sterilization target;
    a first light emitter configured to emit a first light in the outlet direction of the spiral air current blown out from the outlet; and
    a second light emitter configured to emit a second light in the outlet direction of the spiral air current blown out from the outlet,
    wherein the grille comprises a plurality of openings extending from the first light emitter to the second light emitter, the plurality of openings having a curled shape curling clockwise or counterclockwise when viewed in the axial direction of the fanner.

2. The sterilization apparatus according to claim 1, wherein
    the chemical solution comprises a sterilizing agent and a fluorescent agent that glows due to irradiation with an ultraviolet light, and
    the first light comprises the ultraviolet light.

3. The sterilization apparatus according to claim 2, wherein the second light comprises a visible light.

4. The sterilization apparatus according to claim 3, wherein
    the first light emitted by the first light emitter comprises a first outer diameter and the second light emitted by the second light emitter comprises a second outer diameter, and the first outer diameter is larger than the second outer diameter.

5. The sterilization apparatus according to claim 4, wherein the fanner further comprises:
a barrel; and
a fan provided inside the barrel,
the inlet is provided at a first end portion in an axial direction of the barrel,
the outlet is provided at a second end portion opposite to the first end portion in the axial direction of the barrel,
the fan inhales the air through the inlet and blows out, through the outlet, the air inhaled through the inlet, and
the first light emitter is annular in shape when viewed in the axial direction of the barrel, surrounding a circumference of the second light emitter.

6. A method of sterilizing a sterilization target with a sterilization apparatus, the sterilization apparatus comprising:
a fanner comprising an inlet through which air is inhaled, an outlet from which the air is blown out, and a grille provided at the outlet, the fanner being configured to blow out a spiral air current from the outlet in an outlet direction;
an atomizer configured to spray a chemical solution for sterilization into the air to be blown out from the outlet or into the spiral air current blown out from the outlet in the outlet direction, the chemical solution comprising a sterilizing agent and a fluorescent agent that glows due to irradiation with an ultraviolet light;
a first light emitter configured to emit a first light comprising the ultraviolet light in the outlet direction of the spiral air current blown out from the outlet; and
a second light emitter configured to emit a second light in the outlet direction of the spiral air current blown out from the outlet,
wherein the grille comprises a plurality of openings extending from the first light emitter to the second light emitter, the plurality of openings having a curled shape curling clockwise or counterclockwise when viewed in the axial direction of the fanner,
the method comprising:
(a) blowing out the spiral air current by the fanner with the atomizer spraying the chemical solution such that the sterilizing agent and the fluorescent agent adhere to the sterilization target and the sterilizing agent adhering to the sterilization target sterilizes the sterilization target; and
(b) irradiating the fluorescent agent adhering to the sterilization target with the first light by the first light emitter, to cause the fluorescent agent to glow.

7. The method according to claim 6, the method further comprising, after the (a) blowing out, (c) blowing out the spiral air current by the fanner with the atomizer having stopped spraying the chemical solution, to cause the sterilizing agent adhering to the sterilization target to evaporate or to be blown away.

8. The method according to claim 6, wherein
the (a) blowing out further comprises blowing out the spiral air current by the fanner with the second light emitter irradiating the sterilization target with the second light and the atomizer spraying the chemical solution such that the sterilizing agent and the fluorescent agent adhere to the sterilization target and the sterilizing agent adhering to the sterilization target sterilizes the sterilization target.

9. A method of sterilizing a sterilization target with a sterilization apparatus, the sterilization apparatus comprising:
a fanner comprising an inlet through which air is inhaled, an outlet from which the air is blown out, and a grille provided at the outlet, the fanner being configured to blow out a spiral air current from the outlet in an outlet direction;
an atomizer configured to spray a chemical solution for sterilization into the air to be blown out from the outlet or into the spiral air current blown out from the outlet in the outlet direction, the chemical solution comprising a sterilizing agent;
a first light emitter configured to emit a first light comprising a visible light in the outlet direction of the spiral air current blown out from the outlet; and
a second light emitter configured to emit a second light in the outlet direction of the spiral air current blown out from the outlet,
wherein the grille comprises a plurality of openings extending from the first light emitter to the second light emitter, the plurality of openings having a curled shape curling clockwise or counterclockwise when viewed in the axial direction of the fanner,
the method comprising:
(a) blowing out the spiral air current by the fanner with the first light emitter irradiating the sterilization target with the first light and the atomizer spraying the chemical solution such that the sterilizing agent adheres to the sterilization target and the sterilizing agent adhering to the sterilization target sterilizes the sterilization target.

10. The method according to claim 9, the method further comprising, after the (a) blowing out, (b) blowing out the spiral air current by the fanner with the atomizer having stopped spraying the chemical solution, to cause the sterilizing agent adhering to the sterilization target to evaporate or to be blown away.

* * * * *